(12) United States Patent
Begis et al.

(10) Patent No.: US 6,678,812 B1
(45) Date of Patent: *Jan. 13, 2004

(54) METHOD AND APPARATUS FOR OPTIMIZING HARD DRIVE PERFORMANCE

(75) Inventors: Glenn Begis, Hillsboro, OR (US); Lonnie McAlister, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1139 days.

(21) Appl. No.: 08/586,611

(22) Filed: Jan. 16, 1996

(51) Int. Cl.[7] .............................................. G06F 13/00

(52) U.S. Cl. .............................. 711/171; 713/1; 711/4

(58) Field of Search ........................... 395/497.02, 439, 395/441; 771/171, 4, 111–114, 154; 713/1–2, 100

(56) References Cited

U.S. PATENT DOCUMENTS

| | | | |
|---|---|---|---|
| 5,027,348 A | * 6/1991 | Curry, Jr. ................... | 370/85.1 |
| 5,034,914 A | * 7/1991 | Osterlund et al. ........... | 395/872 |
| 5,313,626 A | 5/1994 | Jones et al. ............ | 395/182.03 |
| 5,394,537 A | * 2/1995 | Courts et al. ............... | 395/412 |
| 5,452,299 A | * 9/1995 | Thessin et al. ............... | 370/62 |
| 5,539,918 A | * 7/1996 | Allen et al. .................. | 395/853 |
| 5,564,023 A | 10/1996 | Young ........................ | 395/280 |
| 5,592,616 A | 1/1997 | Finch et al. ............ | 395/183.18 |
| 5,627,946 A | * 5/1997 | Strang, Jr. ............... | 360/77.08 |
| 5,640,595 A | * 6/1997 | Baugher et al. ............ | 395/830 |
| 5,652,864 A | * 7/1997 | Hine .......................... | 711/171 |

OTHER PUBLICATIONS

Karnes, "IDE speed up. (Windows Workshop) (Hard drive accelerator software) (Software Review) (Evaluation) (Column)",1994, pp. 1–2.*
Somogyi, "Hard Disk Toolkit. (Software Review) (FWB Inc. Hard Disk Toolkit) (Evaluation)," 1992, pp. 1–2.*
Martin et al., "ARQ Protocols with Adaptive Dlock Size Perform Beller Over a Wide Range of Bit Error Rates," IEEE 1990, pp. 737–739.*
Choudhary et al., "Experimental Evaluation of Multilevel Caches for shared memory moultiprocessors," IEEE 1991, pp. 409–420.*
Fu et al, "Data Prefetching strategies for vector cache memories," IEEE 1991, pp. 555–560.*
Weikum et al., "Tunings of Striping Units in Disk–Array––Based filed Systems," IEEE 1992, pp. 80–87.*
PCT International Search Report dated Apr. 14, 1997 (4 pgs.).

* cited by examiner

Primary Examiner—Matthew Kim
Assistant Examiner—Denise Tran
(74) Attorney, Agent, or Firm—Blakely. Sokoloff, Taylor & Zafman LLP

(57) ABSTRACT

A hard drive optimization function is provided to the set-up utility of the basic input/output service (BIOS) of a computer system. When executed, the optimization function benchmarks the hard drive's overall performance with sequential accesses for a number of transfer block sizes, employing various access block sizes for each transfer block size. In one embodiment, the optimization function determines the optimal transfer block size by comparing the average throughput (kbytes/sec) for the transfer block sizes examined. The average throughput for each transfer block size is determined through a number of sequential accesses made using the access block sizes. The access block sizes are systematically synthesized in accordance to a number of benchmarking parameters.

21 Claims, 5 Drawing Sheets

METHOD AND APPARATUS FOR OPTIMIZING HARD DRIVE PERFORMANCE

BACKGROUND OF THE INVENTION

1. Field of the Invention

The present invention relates to the field of computer system performance. More specifically, the present invention relates to the optimization of hard drive performance.

2. Background Information

Definitions used within this application:

Transfer Block Size: The number of blocks (sectors) transferred from the hard drive to the hard drive's host processor before the hard drive issues a processor interrupt. Access Block Size: The number of blocks (sectors) requested by the basic input/output service (BIOS) or a device driver.

Due to the consuming public's awareness of various performance specifications, many hard drive vendors have opted for faster external interface timing specifications. However for various architectural reasons, having faster external interface timing does not necessarily result in overall faster throughput. A faster external interface could result in decreased throughput if the hard drive is unable to sustain the reading of data from sequential sectors without experiencing missed revolutions.

Many hard drives employ a single ported internal data buffer which must be multiplexed between the external interface and the internal read/write heads. By having very aggressive external interface timing the proper balance of access between the external interface, the internal read/write heads, and the internal data buffer might not be achieved, causing the internal read/write heads being denied access to the single ported internal data buffer at the beginning of a sector, resulting in missed disk revolutions. In other words, no data will be transferred between the media and the single ported internal data buffer during these revolutions.

The frequency of having missed disk revolutions is dependent upon the Transfer Block Size, the Access Block Size, and the ability of the drive to intelligently manage its buffer. The Access Block Size is an attribute of the Operating System and Device Driver or BIOS being used to access the hard drive. Transfer Block Size may be negotiated between the software running on the host processor (either the Device Driver or BIOS) and the hard drive.

Today, most BIOS either do not account for differences in hard drives and arbitrarily assign a Transfer Block Size, or allow a user to interrupt the boot-up process, and specify a Transfer Block Size. The user specified Transfer Block Size is stored in CMOS[1] memory where it is retained for subsequent boot-ups until it is overridden with a new value. However, for personal computer systems, only the very sophisticated users understand how the hard drives' overall performance can be fine tuned by altering the Transfer Block Size. Even for these sophisticated users, very little help is available for them to ascertain what the appropriate Transfer Block Size should be.

Thus, it is desirable if hard drive performance can be improved with a more user friendly approach. As will be described in more detail below, the present invention achieves these and other desirable results.

SUMMARY OF THE INVENTION

A hard drive optimization function is provided to the set-up utility of the BIOS of a computer system. When executed, the optimization function benchmarks the hard drive's overall performance with sequential accesses employing various Access Block Sizes and Transfer Block Sizes. In one embodiment, the optimization function determines the optimal Transfer Block Size by comparing the average throughput (kbytes/sec) for a number of Transfer Block Sizes. The average throughput for each Transfer Block Size is determined through a number of sequential accesses made using different Access Block Sizes. The Access Block Sizes are systematically synthesized in accordance to a number of benchmarking parameters. The number of Transfer Block Sizes examined are predetermined.

In one embodiment, the benchmarking parameters include an initial access block size, an increment size, and a maximum access block size,. The benchmarking parameters may be specified by the user through the user interface of the set-up utility. Preferably, the benchmarking parameters may be specified indirectly by having the user specify an operating environment type and/or defaulted.

Preferably, the user is provided with feedback on the benchmarking results.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for ease of understanding, certain method steps are delineated as separate steps, however, these separately delineated steps should not be construed as they are necessarily order dependent in their performance.

Figure 1:
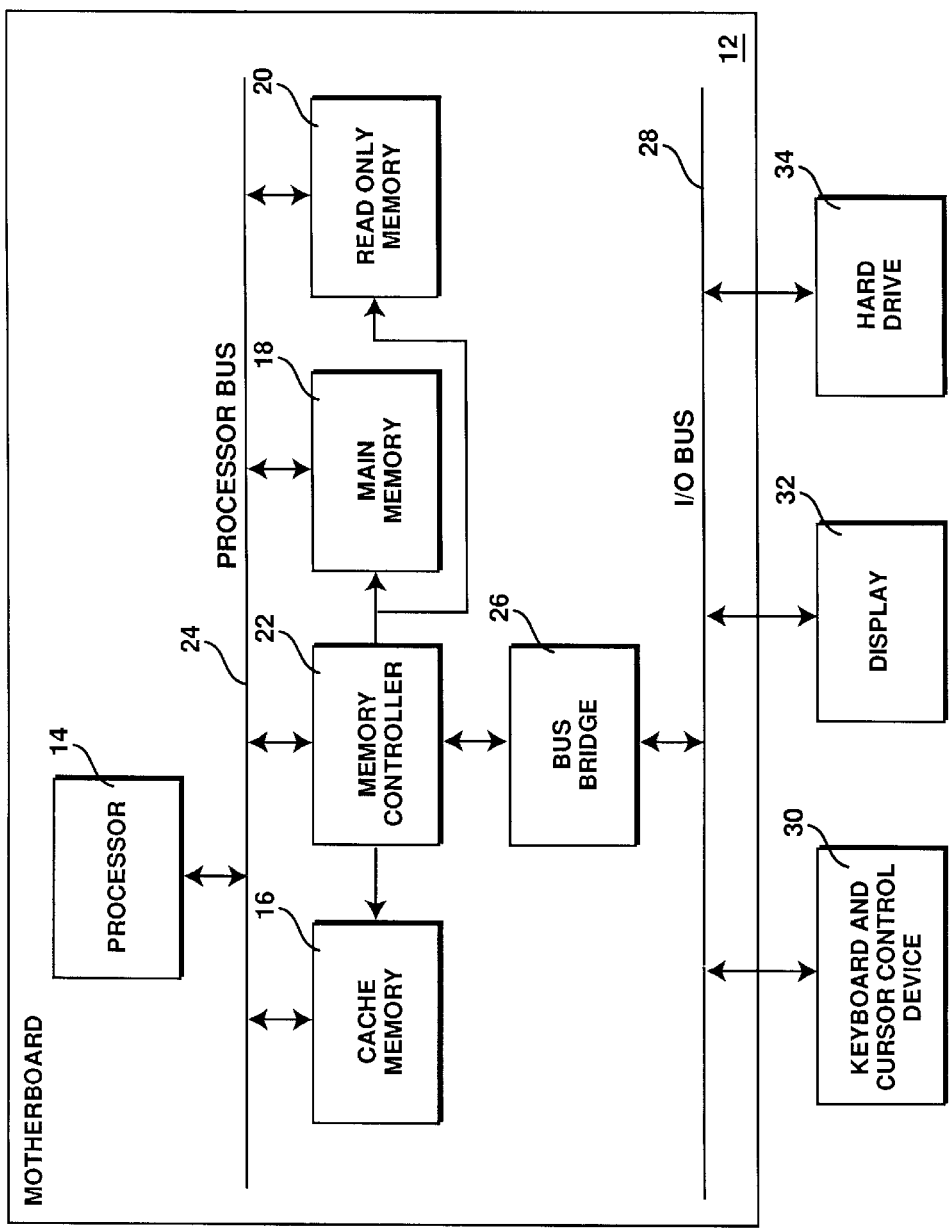
FIG. 1 illustrates an exemplary computer system incorporating the teachings of the present invention.

Referring now to FIG. 1, a block diagram illustrating an exemplary computer system 10 incorporating the teachings of the present invention is shown. Exemplary computer system 10 includes processor 14, cache memory 16, main memory 18, read-only memory 20, memory controller 22 and processor bus 24 coupled to each other as shown. Read-only memory 20 includes BIOS having a set-up utility incorporated with the hard drive optimization function of the present invention. Additionally, computer system 10 includes bus bridge 26, I/O bus 28, keyboard and cursor control device 28, display 32, and hard drive 34, coupled to each other and the above enumerated elements as shown. Hard drive 34 includes the drive controller (not shown). For the illustrated embodiment, elements 14–28 are disposed on motherboard 12.

Except for the hard drive optimization function incorporated in the setup utility of BIOS, these elements 12–34 perform their respective conventional functions known in the art, and may be implemented in any one of a number of techniques known in the art. In fact, exemplary computer system 10 is intended to represent a broad category of computer systems including but not limited to computer systems based on Intel® Architecture Processors.

Figure 2:
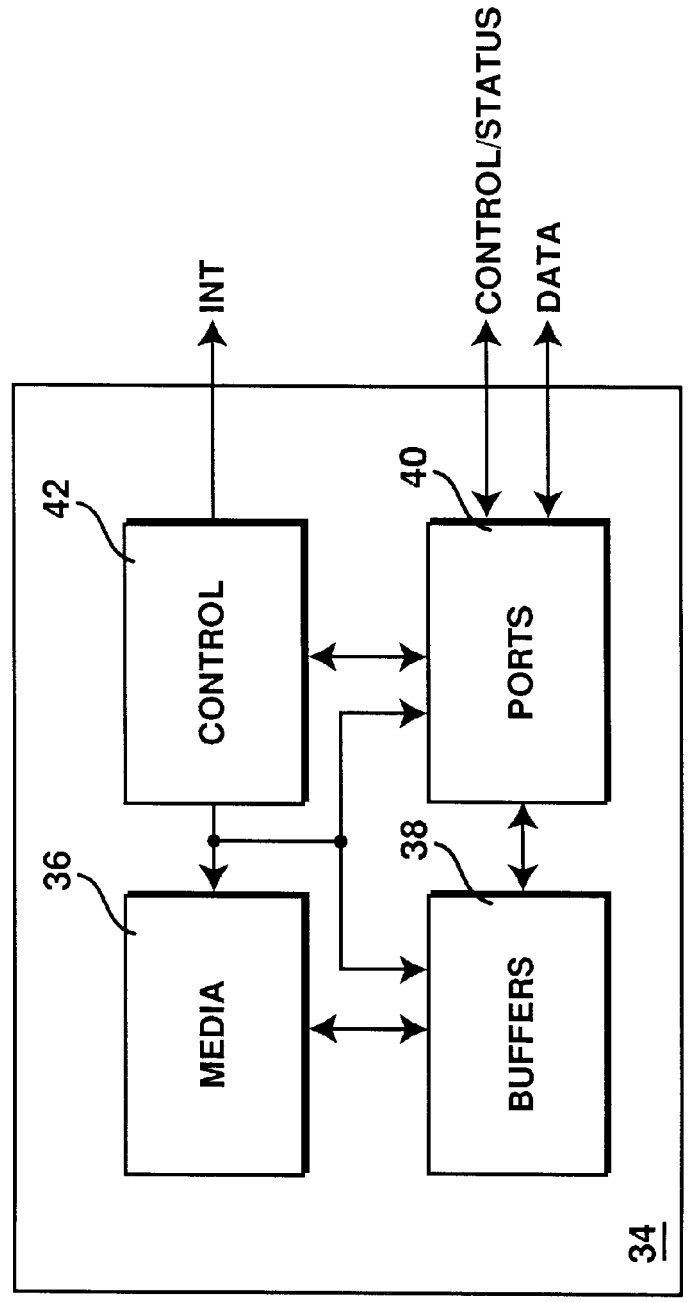
FIG. 2 illustrates hard drive of FIG. 1 in further detail.

FIG. 2 illustrates one embodiment of hard drive 34 of FIG. 1 in further detail. As shown, hard drive 34 includes media 36, buffers 38, ports 40 and control circuitry 42, coupled to each other. Media 36 is used to magnetically stored data. Buffers 38 are used for buffering data being transferred to and from media 36. Ports 40 are used for transferring control/status and data to and from hard drive 34. Control circuitry 42 controls the operation of media 36, buffers 38 and ports 40. Buffers 38 are single ported. In other words, control circuitry 42 alternatingly allocates buffers 38 for transferring data to and from media 36, and transferring data to and from ports 40.

Figure 3:
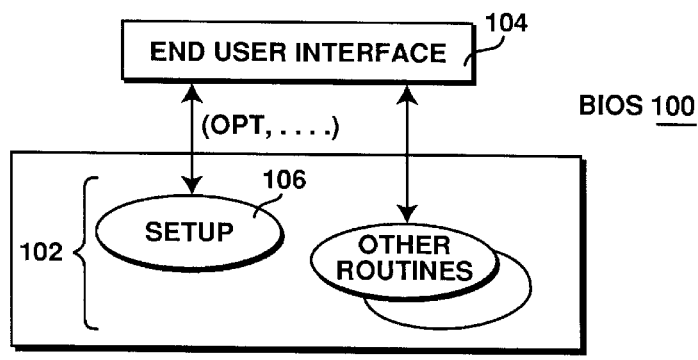
FIG. 3 illustrates BIOS of the exemplary computer system in further detail.

FIG. 3 illustrates the BIOS included in read-only memory 20 of FIG. 1 in further detail. As shown, BIOS 100 includes a number of routines 102, in particular, set-up utility 106, and end user interface 104. Set-up utility 106 is used for setting various system parameters for the purpose of configuring computer systems. Particular examples of system parameters include memory sizes, port addressed, hard drive Transfer Block Size etc. In accordance to the present invention, set-up utility 106 includes an optimization function of the present invention for determining the optimal hard drive Transfer Block Size for a user, upon request; and end user interface 104 includes facilities for the user to provide set-up utility 106 with the request. In one embodiment, end user interface 104 is displayed when the boot-up process is interrupted by the user hitting a predetermined function key. As will be described in more detail below, the determination is made through benchmarking the performance of hard drive 34 in accordance to a number of benchmarking parameters. Thus, end user interface 104 also includes facilities for the user to specify the benchmarking parameters. Preferably, the facilities allow the user to specify the benchmarking parameters indirectly by specifying his/her operating environment type, e.g. Windows 3.1, Windows 95 etc. End user interface 104 may be implemented in a variety of manners, and is well within the ability of those skilled in the art. Accordingly, end user interface 104 will not be further described.

Figure 4:
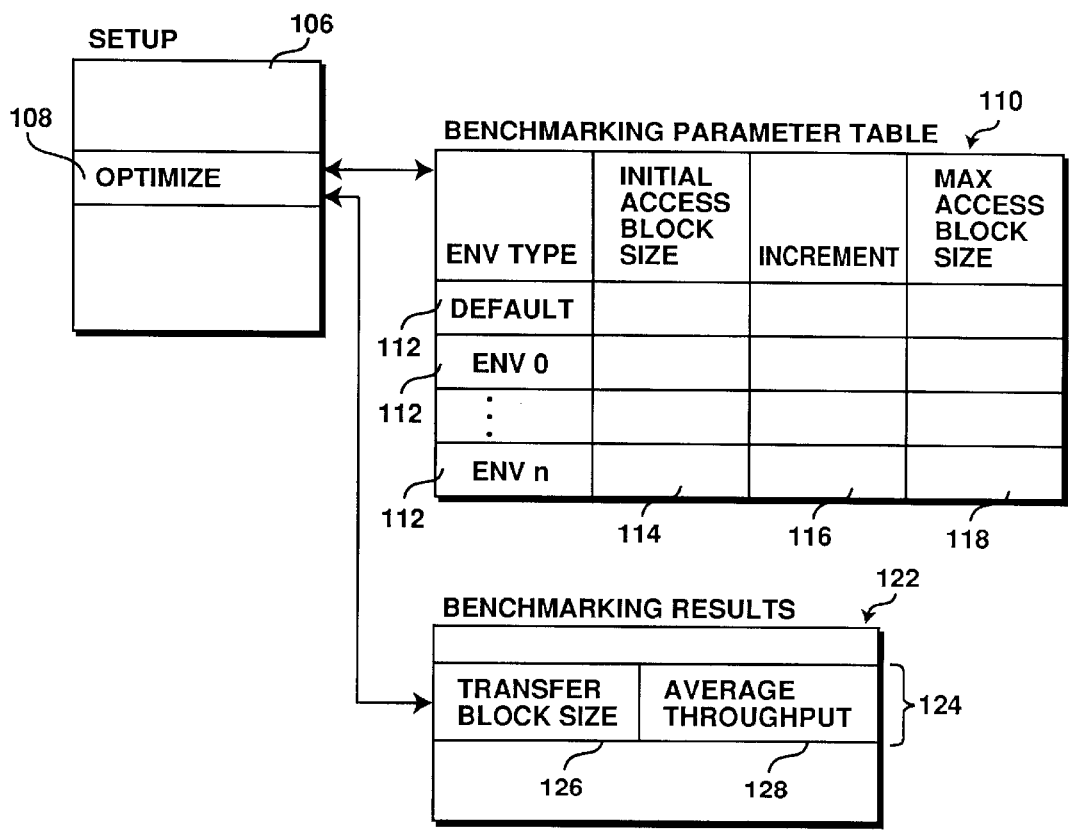
FIG. 4 illustrates one embodiment of the optimization function of the present invention in further detail.

FIG. 4 illustrates one embodiment of the optimization function of set-up utility 106 in further detail. As shown, for the illustrated embodiment, optimization function 108 is preferably provided with complementary benchmarking parameter table 110. Benchmarking parameter table 110 includes a number of benchmarking parameter sets 112, organized by operating environment type. Preferably, benchmarking parameter sets 112 include a defaulted set to be employed when the user does not specify the benchmarking parameters to be employed, neither explicitly nor implicitly through the specification of an environment type.

For the illustrated embodiment, each benchmarking parameter set 112 includes at least an initial Access Block Size 114, an increment size 116, and a maximum Access Block Size 118. Initial Access Block Size 114 specifies the starting benchmarking Access Block Size. Increment size 116 specifies the amount to increment the benchmarking Access Block Size for each subsequent iteration. Maximum Access Block Size 118 specifies the largest Access Block Size to benchmark.

Still referring to FIG. 4, as shown, during execution, optimization function 108 tracks the performance data of hard drive 34 in benchmarking result file 122. For the illustrated embodiment, benchmarking result file 122 includes a number of benchmarking result records 124. Each benchmarking result record 124 includes at least the Transfer Block Size 126 and the average throughput (in kbytes/sec.) 128 for the accesses made. Optimization function 108 uses these recorded data to determine the optimal Transfer Block Size. Preferably, optimization function 108 also uses these recorded data to provide benchmarking result feedback to the user.

Figure 5:
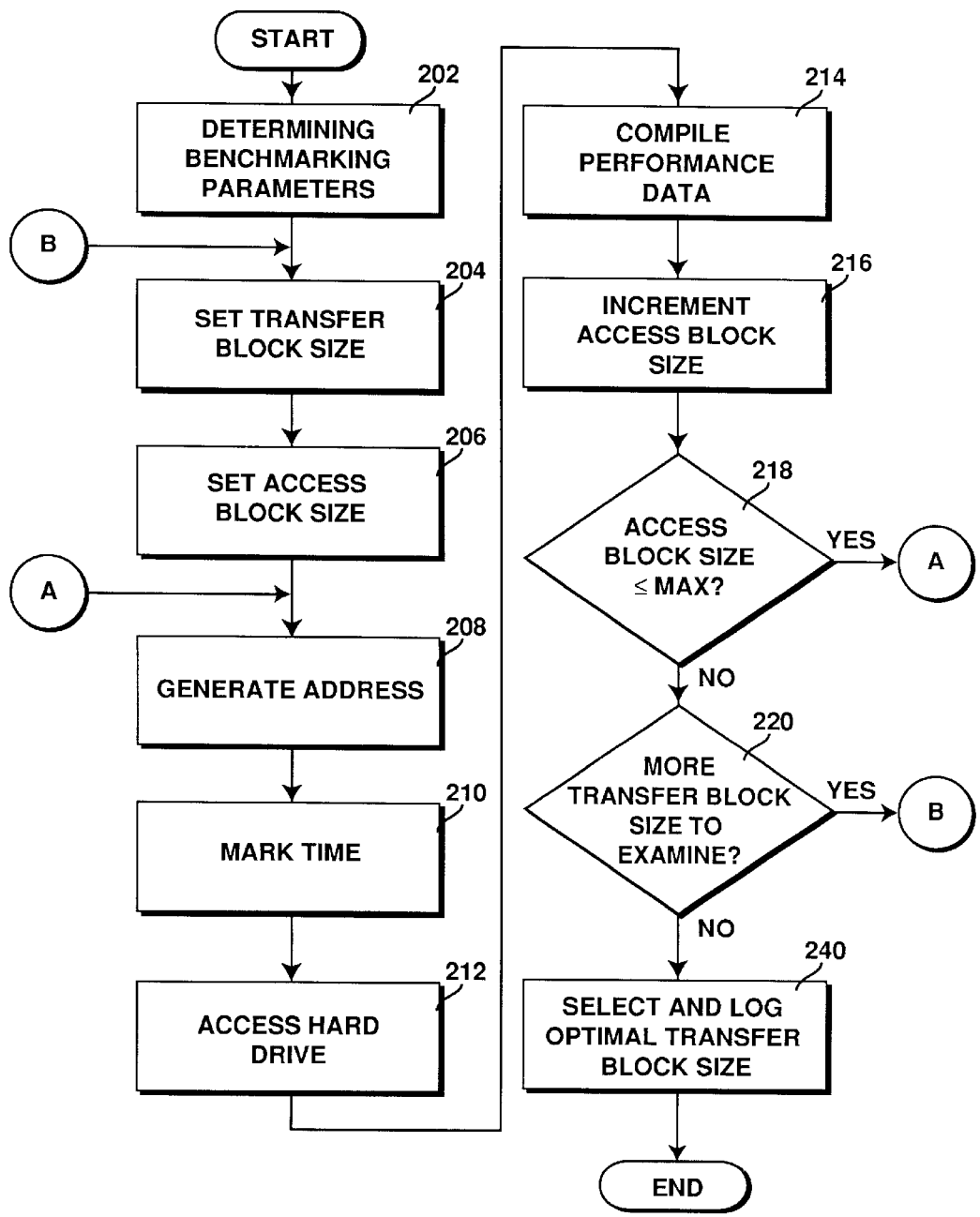
FIG. 5 illustrates one embodiment of the operation flow of the optimization function in further detail.

FIG. 5 illustrates one embodiment of the operation flow of optimization function 108. As described earlier, optimization function 108 is invoked when the user requests optimization through end user interface 104. Upon invocation, optimization function 108 determines the benchmarking parameters to be employed, step 202. In other words, optimization function 108 determines if the user has explicitly specified the benchmarking parameters through end user interface 104, or implicitly specified the benchmarking parameters by specifying an environment type, or neither. In the first case, the explicitly specified benchmarking parameters will be used. In the second and third case, the corresponding or defaulted benchmarking parameter set 112 is used.

Once the benchmarking parameters are determined, optimization function 108 sets the Transfer Block Size to the first Transfer Block Size to be examined and the current benchmarking Access Block Size to the initial Access Block Size, steps 204 and 206. Optimization function 108 then generates a random address, step 208, marks the time, step 210, and performs a read using the benchmarking Access Block Size, step 212. Upon obtaining all the data, optimization function 108 computes and updates the performance data for the Transfer Block Size, step 214. For the illustrated embodiment, optimization function 108 notes the elapsed time, computes and updates the average throughput, i.e. kbytes/sec. Next, optimization function 108 increments the Access Block Size, step 216, and determines the incremented Access Block Size is still less than or equal to the maximum benchmarking Access Block Size, step 216. If the incremented Access Bloc Size is still less than or equal to the maximum benchmarking Access Block Size, optimization function 108 repeats steps 208–216. Optimization function 108 repeats steps 208–216 until it is determined in step 218 that the maximum benchmarking Access Block Size has been exceeded.

Optimization function 108 then repeats the process for the next Transfer Block Size to be examined. The process continues until optimization function 108 determines at step 220 that all Transfer Block Sizes to be examined have been examined. Optimization function 108 then examines the recorded performance data to select the optimal Transfer Block Size, step 240.

Figure 6:
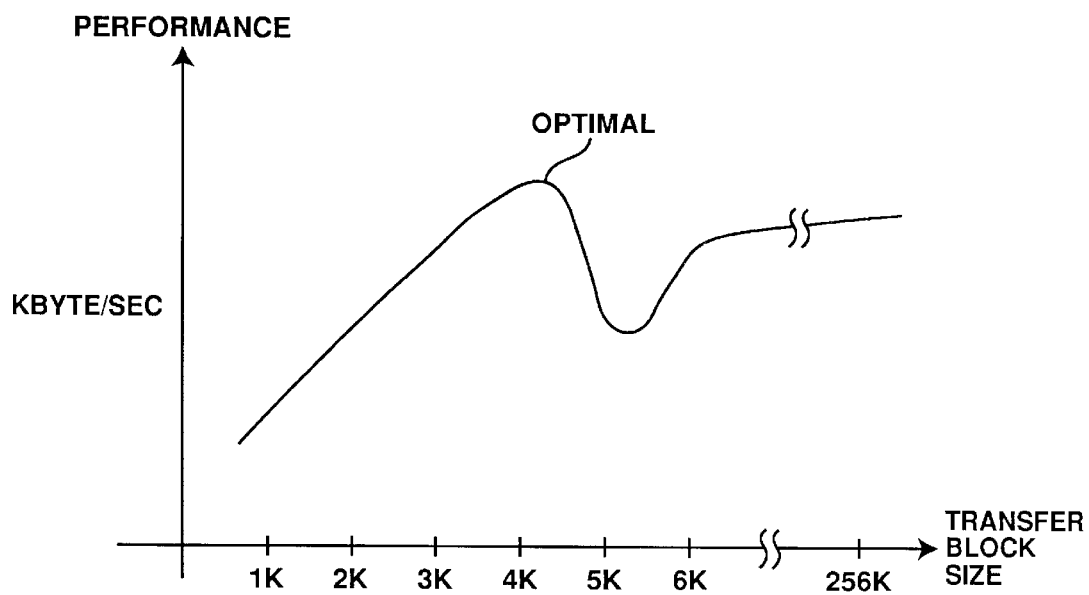
FIG. 6 illustrates an exemplary feedback on the benchmarking results for the user.

As described earlier, preferably the user is provided with benchmarking result feedback. FIG. 6 illustrates an exemplary graphical feedback provided by optimization function 108. For the exemplary graphical feedback, throughput data in kbytes/sec are plotted on the Y-axis, whereas the Transfer Block Sizes examined are plotted on the X-axis.

Thus, a method and apparatus for optimizing hard drive performance in a more user friendly manner has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A circuit board for use to form a system with a hard drive, the circuit board comprising a non-volatile memory to store executable codes of a function that, when executed by a processor of the system, determines an optimal transfer block size for the hard drive by benchmarking accesses to the hard drive for a plurality of benchmarking transfer block sizes in accordance with a set of benchmarking parameters.

2. The circuit board as set forth in claim 1, wherein
the function systematically synthesizes the benchmarking access block sizes using the benchmarking parameters;
for each benchmarking access block size, the function further determines an average throughput rate; and
the function selects the benchmarking access block size yielding the largest average throughput rate as the optimal access block size.

3. The circuit board as set forth in claim 1, wherein
the benchmarking parameters include an initial access block size, an increment size, and a maximum access block size, and
the function benchmarks accesses to the hard drive by systematically synthesizing the benchmarking access block sizes using the initial access block size, increment size, and maximum access block size, and making random accesses to the hard drive for each synthesized benchmarking access block size.

4. The circuit board as set forth in claim 1, wherein
the non-volatile memory also stores executable codes of an utility of which the function is an integral part, including said executable codes of the function;
the utility includes an user interface having facilities through which a user can request execution of the function.

5. The circuit board as set forth in claim 4, wherein the user interface further includes facilities through which the user explicitly specifies the benchmarking parameters.

6. The circuit board as set forth in claim 4, wherein
the function includes a complementary benchmarking parameter table having a plurality of benchmarking parameter sets organized by operating environment types; and
the user interface further includes facilities through which the user implicitly specifies the benchmarking parameters by specifying an operating environment type.

7. The circuit board as set forth in claim 1, wherein the function includes a defaulted set of benchmarking parameters to be employed as the benchmarking parameters by the function when the function is not provided the benchmarking parameters by a user.

8. A computer system comprising a processor, a hard drive and a circuit board having a non-volatile memory to store executable codes of function, wherein when executed by the processor, the function determines an optimal access block size the hard drive by benchmarking accesses to the hard drive for a plurality of benchmarking access block sizes in accordance with a set of benchmarking parameters.

9. The computer system as set forth in claim 8, wherein
the function systematically synthesizes the benchmarking access block sizes using the benchmarking parameters;
for each benchmarking access block size, the function further determines an average throughput rate; and
the function selects the benchmarking access block size yielding the largest average throughput rate as the optimal access block size.

10. The computer system as set forth in claim 8, wherein
the benchmarking parameters include an initial access block size, an increment size, and a maximum access block size, and p1 the function benchmarks accesses to the hard drive by systematically synthesizing the benchmarking access block sizes using the initial access block size, increment size, and maximum access block size, and making random accesses to the hard drive for each synthesized benchmarking access block size.

11. The computer system as set forth in claim 8, wherein
the computer system comprises an utility of which the function is an integral part; and
the utility further includes an user interface having facilities through which a user can request execution of the function.

12. The computer system as set forth in claim 11, wherein the user interface further includes facilities through which the user explicitly specifies the benchmarking parameters.

13. The computer system as set forth in claim 11, wherein
the function includes a complementary benchmarking parameter table having a plurality of benchmarking parameter sets organized by operating environment types; and
the user interface further includes facilities through which the user implicitly specifies the benchmarking parameters by specifying an operating environment type.

14. The computer system as set forth in claim 8, wherein the function includes a default set of benchmarking parameters to be employed as the benchmarking parameters by the function when the function is not provided the benchmarking parameters by the user.

15. In a computer system having a hard drive and a non-volatile memory, a method for optimizing performance of the hard drive, the method comprising:
a) systematically synthesizing a plurality of benchmarking access block sizes in accordance with a plurality of benchmarking parameters by a plurality of programming instructions stored within the non-volatile memory of the computer;
b) performing a plurality of benchmark accesses for each of the synthesized benchmark access block sizes and determining an average data throughput rate for the benchmark accesses performed; and
c) determining an optimal access block size for use during operation by selecting the benchmarking access block size that yields the largest average data throughput rate as the optimal access block size.

16. The method as set forth in claim 15, wherein the benchmarking parameters of step (a) include an initial access block size, an increment size, and a maximum access block size, and
the benchmarking access block sizes are systematically synthesized using the initial access block size, increment size, and maximum access block size.

17. The method as set forth in claim 15, wherein the benchmarking accesses in step (b) are made randomly.

18. The method as set forth in claim 15, wherein steps (a) through (c) are performed in response to a user request.

19. The method as set forth in claim 18, wherein the benchmarking parameters of step (a) are explicitly specified by the requesting user.

20. The method as set forth in claim 18, wherein step (a) further includes looking up the benchmarking parameters from a benchmarking parameter table having a plurality of benchmarking parameter sets organized by operating environment types, in accordance to an operating environment type provided by the requesting user.

21. The method as set forth in claim 15, wherein the benchmarking parameters of step (a) are default benchmark parameters.

* * * * *